United States Patent [19]

Huang

[11] Patent Number: 4,943,909
[45] Date of Patent: Jul. 24, 1990

[54] COMPUTATIONAL ORIGAMI

[75] Inventor: Alan Huang, Middletown, N.J.

[73] Assignee: AT&T Bell Laboratories, Murray Hill, N.J.

[21] Appl. No.: 71,105

[22] Filed: Jul. 8, 1987

[51] Int. Cl.$^5$ .................. G06F 15/16; G06F 13/00
[52] U.S. Cl. ............................... 364/200; 364/229; 364/229.1; 364/229.5
[58] Field of Search ... 364/200 MS File, 900 MS File

[56] References Cited

U.S. PATENT DOCUMENTS 4,553,203 11/1985 Rau et al. ........................... 364/200
4,740,894 4/1988 Lyon .................................. 364/200

OTHER PUBLICATIONS

Comon et al., "A Systolic Array for Computing $BA^{-1}$", IEEE Transactions on Acoustics, Speech, and Signal Processing, vol. ASSP-35, No. 6, Jun. 1987.
"Data Manipulating Functions in Parallel Processors and Their Implementation," T. Feng, IEEE Transactions on Computers, vol. C-23, No. 3, Mar. 1974, pp. 309-318.
"Access and Alignment of Data in an Array Processors," D. H. Lawrie, IEEE Transactions on Computers, vol. C-24, No. 12, Mar. 1975, pp. 1145-1155.
"Introduction to VLSI Systems," C. Mead et al., Addison-Wesley Publishing Co., Reading, Mass., 1980, pp. 271-273.
"Computational Origmai: A Geometric Approach to Regular Multiprocessing," Haw-Min Lu, thesis, Massachusetts Institute of Technology (1988).

Primary Examiner—Eddie P. Chan
Attorney, Agent, or Firm—Henry T. Brendzel

[57] ABSTRACT

A processor architecture that permits the realization of any computing function with a regular array of interconnected procssing elements comprising as few as one processing element. The processing element can be as complex as desired. In its minimum form it can be as simple as a NOR gate and switch coupled with some delay elements, with the connectivity and the control signals combining to impart the flexiblity. In use, an algorithm to be implemented is conceptually mapped onto an array of processing elements arranged in rows and columns, where the data dependencies in the columns are unidirectional, and the data dependencies in the rows of processing elements are at most unidirectional. One or more actual processing elements are conceptually scanned over the array through time multiplexed controls to emulate the entire conceptual array and thus perform the algorithm. The scheduling of the processing and communications functions performed by the processing element is dictated by the conceptual array layout of the algorithm.

19 Claims, 15 Drawing Sheets

FUNCTION
CONTROL
BUS 18

CARRY   SUM

COMPUTATIONAL ORIGAMI

BACKGROUND OF THE INVENTION

This invention relates to parallel computing, and more specifically to the art of processor architectures that are suitable for highly parallel computations.

With the increased needs for computational speed and complexity, the computing art has turned its attention to parallel processing. The research has extended in many directions, both from the standpoint of the algorithms used and the hardware architectures employed. A good overview of the parallel processing field is found in "Tutorial on Parallel Processing", edited by R. H. Kuhn et al., initially presented at the Tenth International Conference on Parallel Processing, Aug. 25–28, 1981, Bellaire, Mich.

The major issues in parallel computing is identifying a sufficient parallelism to exploit, synchronizing the various processors, and managing the communications between the processing units.

One of the first applications of parallelism was in connection with pipelined architectures. In such an architecture, the required computation is divided into a sequential set of sub-computations, and those sub-computations are carried out in separate, but interconnected hardware. In a sense, one can say that each of the separate hardware pieces is a processor that performs a certain special function on successive input signals.

Multiprocessor networks are another type of parallel computer architectures. In such networks, several computers work concurrently on different discernible portions of a problem, and communicate with each other via messages through the interconnection network to communicate intermediate results and to coordinate the overall solution. The granularity of the parallelism in multiprocessor networks is typically very coarse. A problem is divided into major divisible portions and each processor operates independently until the solution to the divisible portion is developed. The division lines of the problem are selected to minimize the necessary communications and coordination, since the communications process is cumbersome, requiring "handshaking" protocols. This architecture is usually employed with problems that have a high degree of parallelism, relatively simple coordination, and relatively little communication. The reason for that lies in the fact that dividing the problem into subparts often introduces a large communications and coordination burden that overloads the architecture. The "Hypercube" as implemented in Cal Tech by [reference] is an example of such a computer network architecture.

Data flow architecture from yet another type of parallel computer architectures. This architecture is employed most often when the algorithm to be executed can be decomposed into several portions which can be processed independently. This architecture is characterized by a plurality of processors to which the algorithm portions are assigned, and each processor is activated upon arrival of all of the required inputs. As a result, the coordination of the computations is acommplished by the flow of the data. It is quite a general approach for exploiting all of the parallelism that an algorithm has to offer. The main disadvantage is in managing communications to prevent interdependencies which would lead to a "deadlock" situation.

Array processorsd comprise another type of parallel computer architecture. This architecture consists of many functionally equivalent processing elements (PEs) that operate under control of a single control unit. The various processing elements are interconnected to permit data to flow between the processing elements. The interconnection topologies are fixed, although different designs employ different topologies. Some of the interconnection topologies are described in articles such as "Data Manipulating Functions in Parallel Processors and Their Implementation" T. Feng, *IEEE Transactions on Computers*, Vol. C-23, Number 3, Mar. 1974, pp. 309–318, "Access and Alignment of Data in an Array Processor" D. H. Lawrie, *IEEE Transactions on Computers*, Vol. C-24, Number 12, Mar. 1975, pp. 1145–1155, and "Introduction to VLSI Systems", C. Mead et al., Addison-Wesley Publishing Company, Reading, Mass. 1980, pp. 271–273. The array processor topologies permit them to exploit the regularity of various algorithm operations, such as matrix operations, to simplify the coordination and communications between the various processing elements. Because the interconnection arrangements are fixed, array processors are most useful in applications where the same oepration is performed on many data items, such as in applications that involve matrix operations.

In spite of the enhanced computing power that the above-described techniques provide, there are a number of shortcomings to the architectures proposed heretofore. One difficulty is that these architectures are quite specialized and each is adapted to efficiently solve only a narrow class of problems. Another problem is that no guidelines are available in connection with these architectures of how to structure a given task to most efficiently employ the architecture, and vice-versa. Yet another problem is that the above architectures are not employed with dynamic allocation of the available parallelism to most efficiently utilize the available hardware.

SUMMARY OF THE INVENTION

The architecture of my invention overcomes many of the problems in the prior art architectures by employing a processing array of a few as a single processing element (with attendant memory) that emulates an entire array of processing elements. The emulated array may be arbitrarily large. My architecture differs from array processors in that large arrays (rows and columns) of processing elements are emulated with smaller arrays through the use of closely coupled delay elements and in that the processing elements also include a routing, or switching, capability. Control of the delay (and thus memory) in the delay elements determines the interconnection between the processing elements in the array, and full functionality is realized by allowing each processing element it the emulated array to perform any selected function without dependence on the function performed by the neighboring processing element.

In accordance with the principles of my invention, an algorithm to be implemented is conceptually mapped onto an array of processing elements arranged in rows and columns, where the data dependencies in the columns are unidirectional, and the data dependencies in the rows of processing elements are at most unidirectional. This permits one or more actual processing elements to be time multiplexed, to emulate the entire conceptual array and thus perform the algorithm. The scheduling of the processing and communications functions performed by the processing element is dictated by the conceptual array layout of the algorithm.

DETAILED DESCRIPTION

Figure 1:
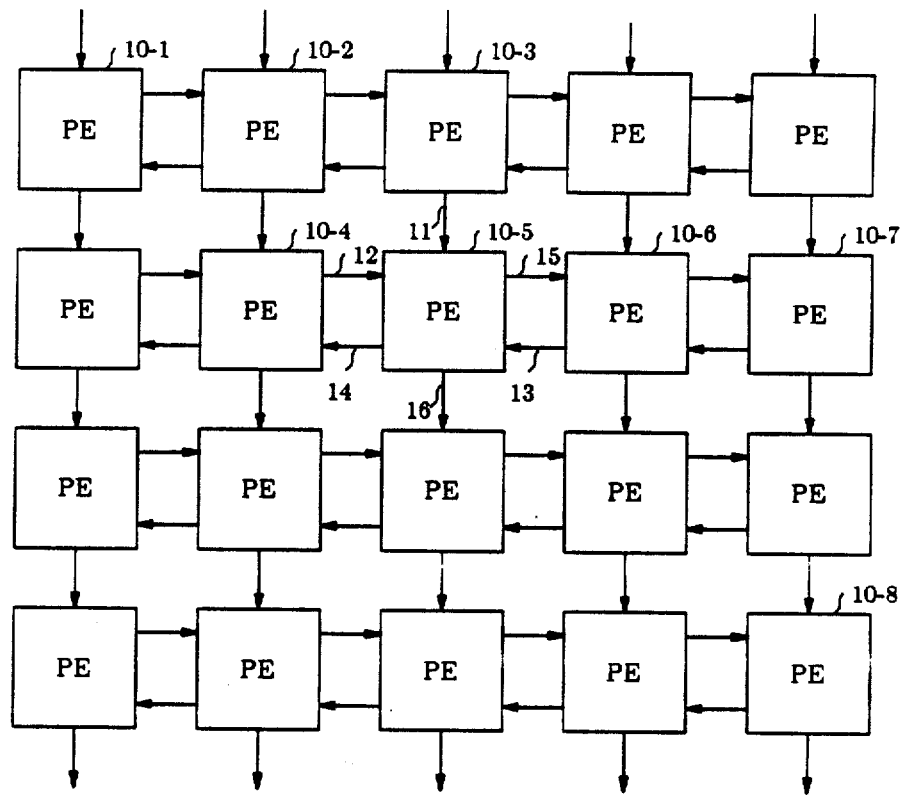
FIG. 1 depicts a two dimensional rectangular array of processing elements.

FIG. 1 presents a two dimensional rectangular architecture which is illustrated in the aforementioned C. Mead et al. book at pp. 271–273. Its architecture is characterized by a rectangular interconnection of elemental processing units 10. Units 10-1 through 10-3 are shown in the first row, units 10-4 through 10-7 are shown in the second row, and unit 10-8 is shown in the last row. Each processor 10 in a particular column and row receives input signals from a processing element in the same column and in the previous row (e.g., via line 11 for unit 10-5) and from two adjacent processing elements in the same row and different columns—one from the left and one from the right—(e.g., lines 12 and 13 for unit 10-5). Correspondingly each element 10 provides output signals to the same adjacent processing elements in its row (e.g., lines 14 and 15 for unit 10-5) and to a processing element in its column and in the successive row (e.g., line 16 for unit 10-5).

Although the FIG. 1 architecture appears in the cited reference in connection with implementing of the so-called "inner product" operation in each processing element, it can be shown that the FIG. 1 architecture can be applied to perform any desired overall function by independently controlling the operation of each of the processing elements and enhancing the communications capability of the processing module to achieve a complete topological cover. This capability can be shown to exist from the following observation. Any task of processing can be divided into a collection of elemental processing steps responsive to input signals which can be carried out sequentially. Many of these processing steps can also be arranged for processing in parallel, followed by some sequentially arranged steps. Sequences of parallel execution of processing steps can be implemented with some general processing elements interconnected with some means for switching which directs the signals to the appropriate processing elements. With respect to FIG. 1, steps to be performed in parallel can be assigned to a row of processors 10, subsequent steps to be performed in parallel can be assigned to a subsequent row of processing elements 10, and directing the signals to a subsequent row of processing elements 10 can be assigned to intervening row, or rows, of elements 10. Elements 10 can be used for switching because one can, in principle, communicate signals between columns, via the horizontal connections (lines 12, 13, 14, and 15). Additionally, it can be shown that the structure of FIG. 1 can realize all necessary computational and signal directing functions as long as each processing element 10 is capable of routing signals from any of the three inputs to any of three outputs, and performing at minimum the set of Boolean functions on the two input signals that form a complete Boolean cover. The first requirement relates to signal communication, while the second requirement relates to signal logical interactions. Together they permit computation.

Figure 2:
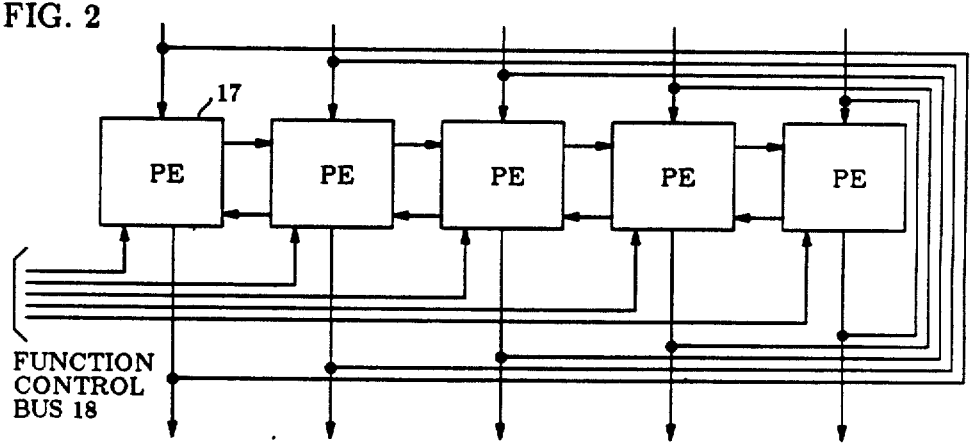
FIG. 2 is the array of FIG. 1, functionally folded onto a single row of processing elements.

In addition to realizing that the FIG. 1 architecture premits one to achieve any desired processing when the processing elements possess the above stated requirements, I have also realized that the computations in each row depend only on the results from the immediately previous row. What that means is that I can multiplex the operations performed in the various rows and fold them onto a single row of processors 17, as shown in FIG. 2. The only difference between processing elements 10 of FIG. 1 and processing elements 17 of FIG. 2 is that elements 17 must include some delay or latching means (delay line, flip-flop, register, or the like) to allow the results of one row's processing to feed back and affect the next row's processing. In addition, means must be provided to control the function that each of the processing elements performs at each iteration. It is realized, of course, that the overall processing throughout of the FIG. 2 array is reduced somewhat from the processing throughput of the FIG. 1 array. Some of the advantages of the FIG. 2 array are, however, that the hardware is minimized and the effective depth of the array (the effective number of rows) is variable and controllable, rather than fixed. The structure is, thus, decoupled from the particular algorithm that is being implemented.

One of the major advantages of the FIG. 2 structure, in accordance with the principles of my invention, is that each of the processing elements in the row is controlled to perform a desired function independently of the function performed in any other processing element in the row (through function control bus 18). Further, none of the processing elements are "stuck" in time but, rather, each can perform different functions, when emulating different rows of the array.

The FIG. 2 architecture, although very powerful, cannot be further reduced because each processing element 17 has data dependencies from both the left and the right adjacent processing elements in the row. That is, the processing of any element 17 cannot be completed until the processing in the adjacent elementon both sides is completed. One cannot, therefore, do the processing in a seriatim manner. This data dependence, or deadlock, prevents the computation from being futher decomposed and thus limits how much time can be traded off to reduce hardware.

Figure 3:
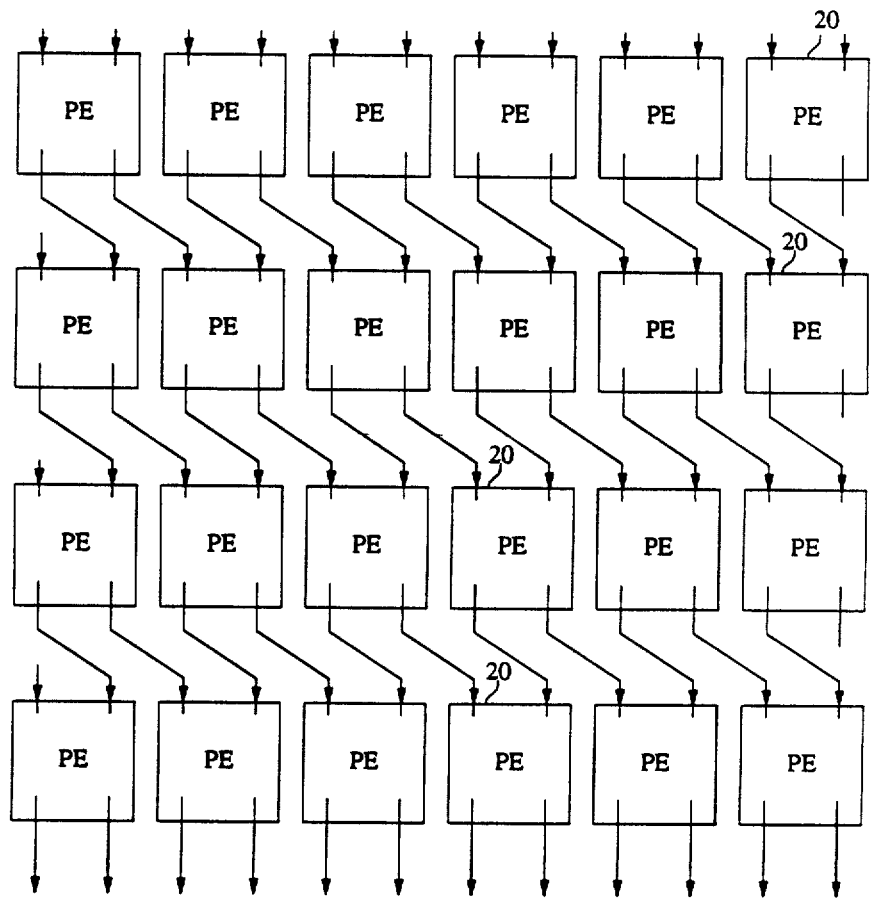
FIG. 3 is a two dimensional rectangular array where the processing elements in a row have no data dependencies on other processing elements in the row.

A superior arrangement is realized with architecture where connections between columns within a row are either from one direction only or completely absent, as shown for example in FIG. 3. A corresponding requirement is that rows supply signals only to other rows that are either above them, or below them, but not both. The FIG. 3 architecture comprises processing elements 20 arranged in rows and columns, with each processing element 20 including two inputs and two outputs. The right input of each element 20 in FIG. 3 is derived from the left output in a processing element of the previous row and in the same column. The left input of each processing element is obtained from the right output in a processing element of the previous row and the left adjacent column. The adjacency relationship in each row is the same for all processing elements in the row. That is, all processing elements in the row are connected to an adjacent processing element in the previous row that is to the left of the processing element. The adjacency relationship within rows need not necessarily be to the left or to the right, and need not be maintained at the same sense between rows. This measure of design freedom is not exercised in the FIG. 3 depiction and some limitations to this design freedom must be imposed if the emulation to be accomplished with just delay lines (or FIFO memories). Breaking up of the two-sided intra-row dependency present in FIG. 1 permits the structure of FIG. 3 to be folded not only in rows but also in columns. Additionally, the use of processing elements 20 that have only two inputs and two outputs permits processor 20 to be implemented with minimal circuitry. The communication portion needs to implement only crossover, bypass, and fork operations, while the logic portion needs to implement only a NOR and NAND function. This minimal circuitry provides a complete topological and logic cover.

Figure 4:
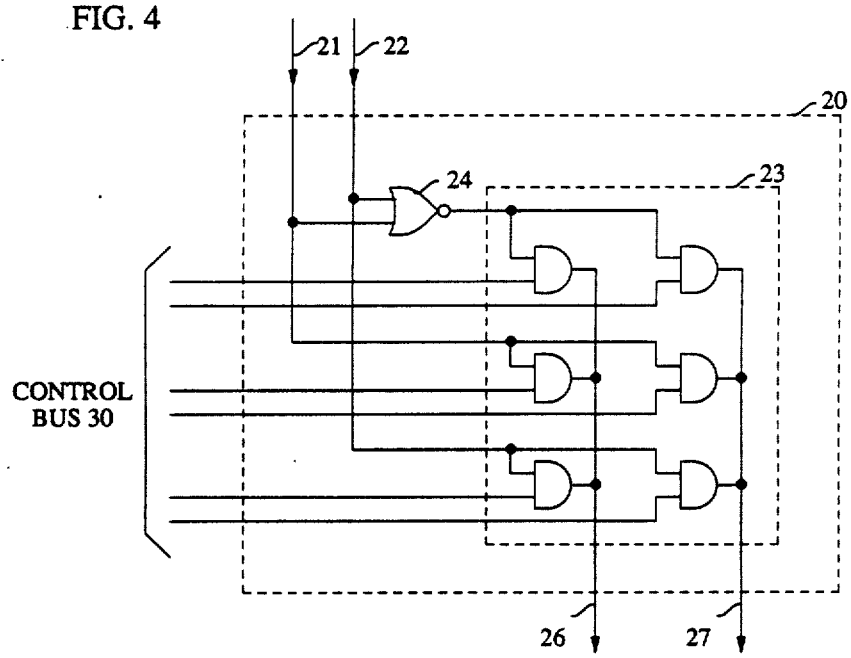
FIG. 4 is a schematic diagram of a processing element that is useful in realizing the FIG. 3 arrangement.

FIG. 4 depicts one embodiment for processing element 20. In essence it is a very basic PLA which includes inputs 21 and 22 connected to a programmable three input by two output crossbar switch 23 which is used to distribute signals to output lines 26 and 27. Lines 21 and 22 are also combined in NOR gate 24, whose output is applied to crossbar switch 23. The cross points within crossbar switch 23 are controllable, or programmable, to effect particular interconnection patterns. Such controllable crosspoints may be realized with AND gates, as shown, that are controlled with a "customizing" control signal obtained from bus 30.

It turns out that the FIG. 4 processing element can realize more than the elemental set of functions specified above and indeed there is no requirement that only the bare minimum is to be provided. In fact, element 20 can be as complex as practical, in the context of the desired functionality, operating speed (affecting throughput), and complexity of control. It can be, for example, a conventional CPU which is caused to execute any one of its rich set of primitive instructions, or even a complete computer which is caused to execute preselected subroutines.

It was indicated above in connection with FIG. 2 that each processing element 17 must be used in conjunction with some delay or memory means. When the FIG. 4 processing element 20 is employed to realize the entire array of FIG. 3, different delay or memory means are necessary. This results from the fact that while the processing element implements the function of a particular element in a row, the values that were previously computed to the left of the particular element and in the same row, and to the right of the element and in the row above must be remembered.

Figure 5:
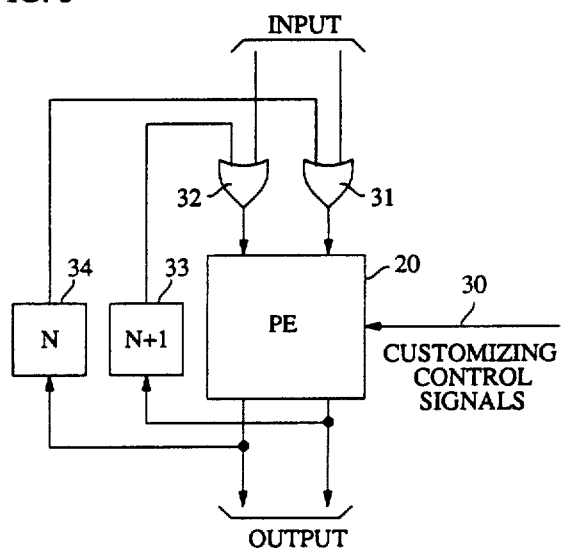
FIG. 5 shows an arrangement with a single processing element combined with FIFO memory means and adapted to emulate an entire array of processing elements.

FIG. 5 depicts an arrangement for realizing the FIG. 3 architecture with a single processing element multiplexed to emulate both the rows and the columns. It includes a processing element 20 as described in FIG. 4 and, in addition, it includes OR gates 31 and 32 feeding element 20 and delay elements 33 and 34 (as discussed above) that receive input signals from the two output ports of element 20, respecitvely. More specifically, the right output of element 20 is applied to delay element 33, and the output of delay element 33 is connected to one of the inputs to OR gate 32. The output of OR gate 32 is connected to the left input of element 20. Correspondingly, the left output of element 20 is applied to delay element 34 and the output of delay element 34 is connected to one of the inputs of OR gate 31. The output of OR gate 31 is connected to the right input of element 20. Elements 33 and 34 are FIFO (first in, first out) memories and the delay provided by elements 33 and 34 is related, of course, to the "width" of the rows in the FIG. 3 architecture, i.e., to the number of processing elements in the rows of the emulated array. Specifically, the memory required of elements 33 and 34 is $$D_{34} = N,$$

and $$D_{33} = N+1$$

where N is the "width" of the row.

Since the FIG. 3 circuit is emulated with the FIG. 5 circuit through time multiplexing, the input, output, and control of the FIG. 5 circuit is sequential. The input signals are applied when the first row is emulated, and the output signals are extracted when the last row is emulated. The customizing control signals (bus 30) are applied with the emulation of each PE in the array. Also because of the time multiplexing, the inputs and the control signals must be applied repetitively, and the outputs must be repetitively captured. This aspect of my architecture is explained in more detail below in connection with an example.

Figure 6:
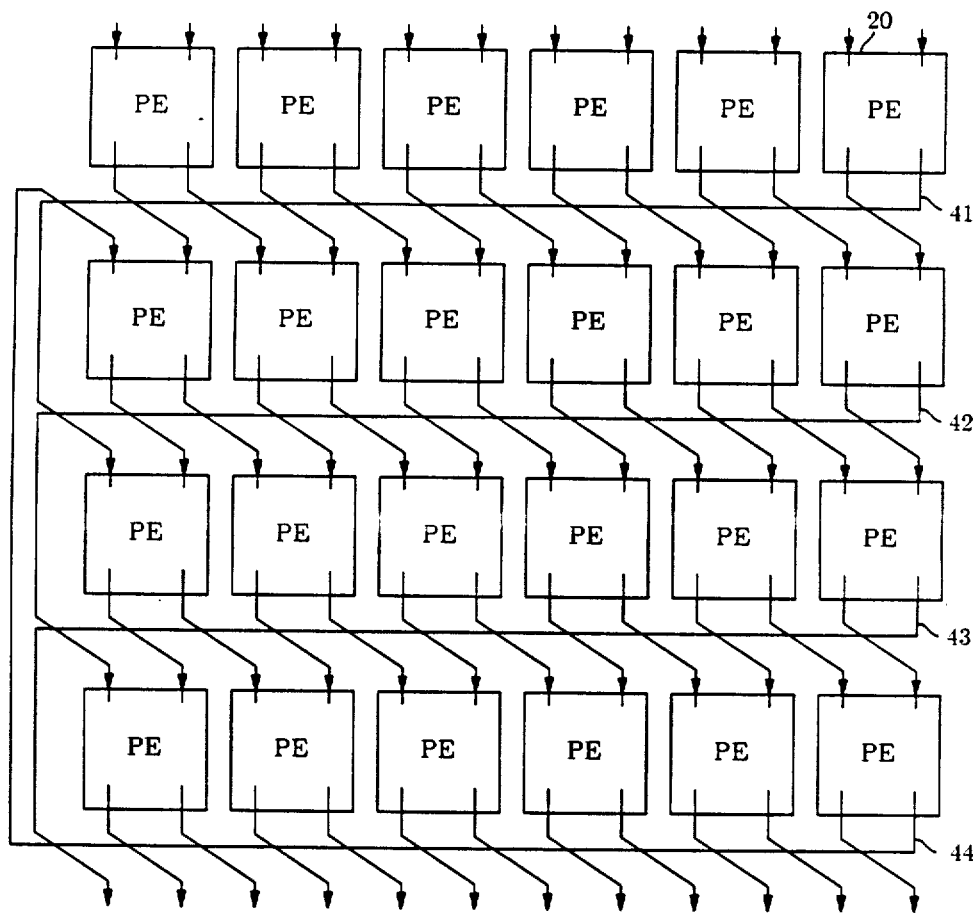
FIG. 6 illustrates the array connectivity that results from multiplexing the FIG. 5 arrangement to emulate an entire array.

Under proper control, the FIG. 5 circuit realizes an array architecture that is essentially identical to the one illustrated in FIG. 3; the only difference is in the treatment of signals at the array edges. That is, the FIG. 5 arrangement causes the array edge output signals to be naturally communicated as input signals at other array edge points and, although these connections are not always utilized, they contribute an additional degree of freedom in the implementation of a particular design. As an example, FIG. 6 illustrates the connectivity of the array edges (lines 41-44) when the FIG. 5 circuit is is used to emulate an entire array.

Figure 7:
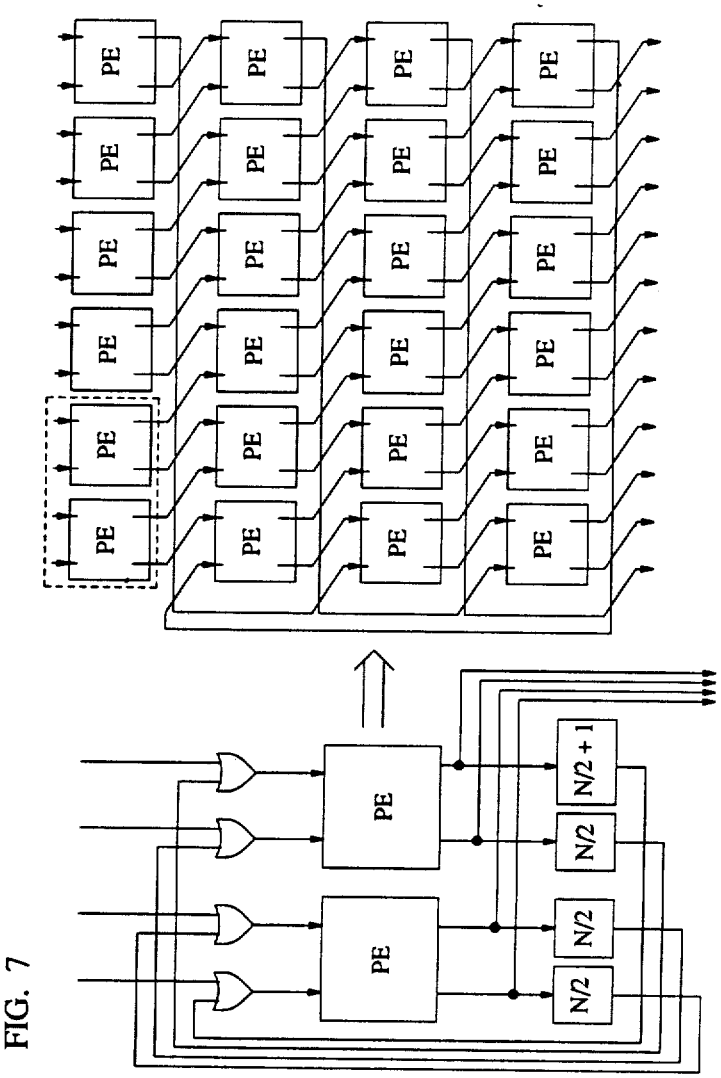
FIGS. 7, 8 and 9 illustrate different processing array arrangements.
Figure 8:
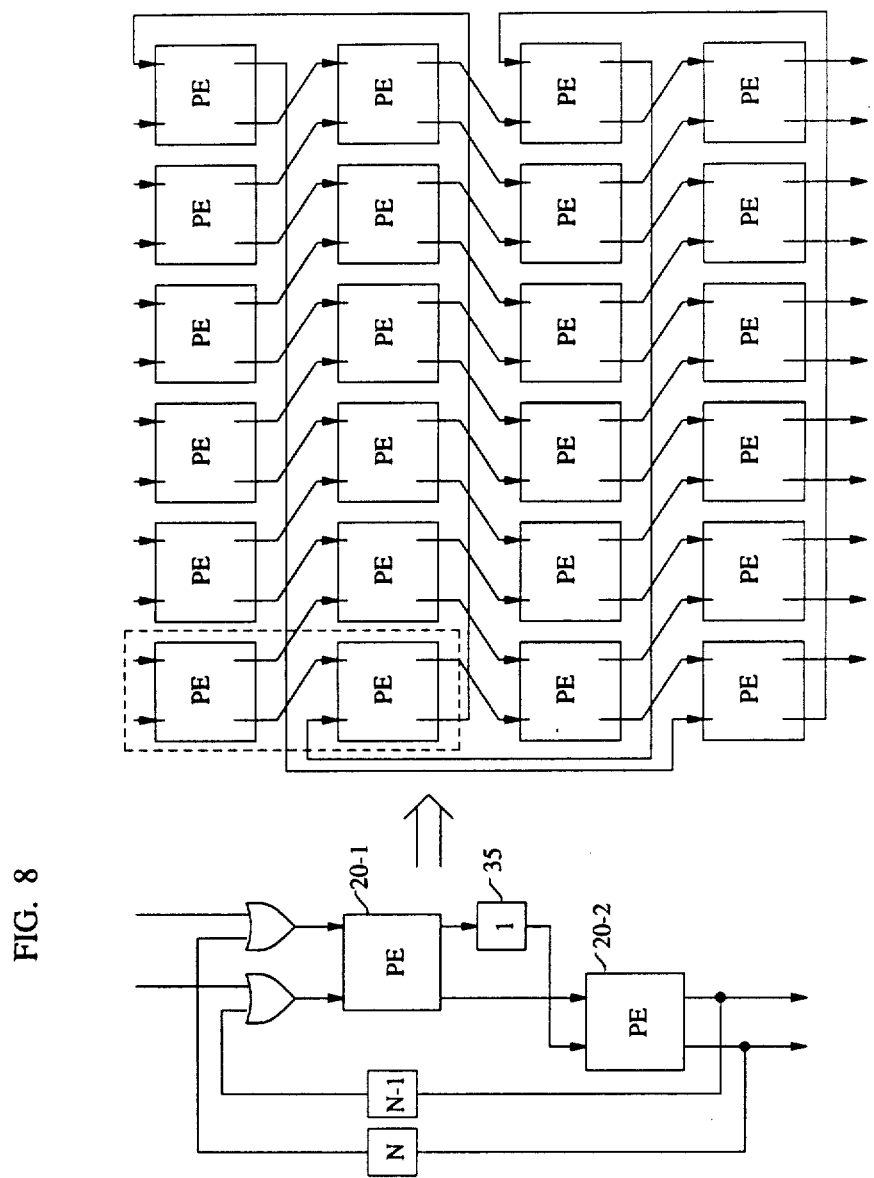
Figure 9:
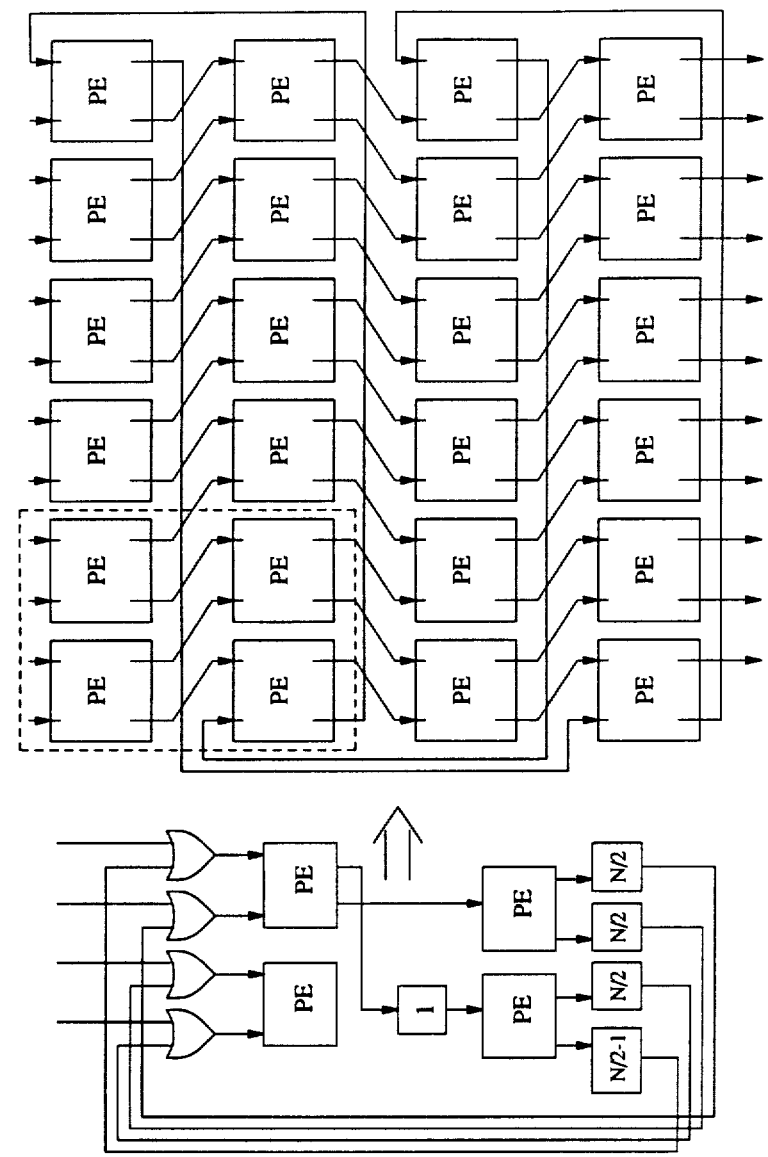

As depicted, the FIG. 5 arrangement includes a single processing element 20 which, in combination with the delay elements, emulates an entire array. Stated conversely, the entire array is folded into a single processing element. However, one major advantage of the FIG. 3 architecture is that the degree of "folding" is selectable. It can be a function of the algorithm realized, the desired processing speed, the hardware available, or a combination of the above. Thus, one can use a single processing element, or reduce the degree of folding by employing two processing elements in a row, two processing elements in a column, a small array of two PEs in a row and two PEs in a column, or any larger array of processing elements having any number of elements in the row and any number of rows of processing elements. FIGS. 7, 8 and 9 provide examples where the sub arrays employed comprise two processing elements in the same row, two processing elements in the same column, and a 2×2 array of processing elements.

In FIG. 7, employing two processing elements in a row requires the use of four delay elements, but each is about half the size of the delays in FIG. 5; to wit, one with a delay of $N/2+1$ (where N is the "length" of a row) and three with delays $N/2$. In FIG. 8, employing two processing elements in a column requires the use of two delay elements as in FIG. 5 and, in addition, a delay element 35 of unit delay which connects the right most output of the top processing element (20-1) to the left most input of the lower processing element (20-2). FIG. 9 illustrates the case where an array is folded onto a 2×2 array of processing elements. It may be noted in passing that FIGS. 8-9 implement an array where the direction sense of column interconnections reverses from row to row.

In addition to possessing flexibility in realizing an array of any desired size, my architecture has the additional flexibility and advantage of concurrently (essentially) realizing any number of arrays of any size and in any order. That is, in one specific application there may be many inputs that appear concurrently and, therefore, it may be useful to have an array with long rows. Selecting the delay values (e.g., $D_{33}$ and $D_{34}$) appropriately provides the desired array width. In such an application the calculations may, perhaps, be accomplised very quickly so the required numbered of rows is small. In some other application, on the other hand, the row widths perhaps need not be large but the number of rows does need to be large. By the same technique of delay control the array may be modified to achieve that result. In still some other application there may be two or more independent tasks that need to be performed simultaneously (time sharing, multi-tasking, etc.) and the user is willing to give up some of the processing speed. In such an application, the emulated array can effectively be subdivided by proper dynamic control of the delay values to optimally suit each of the processes.

As easy as it is to control the width of an emulated array through control of the delay elements, it is even easier to control the number of rows that are emulated. The desired number is realized by controlling when output data is accessed from the processing element(s) and new input data is inserted into the processing element(s), in combination with the control signals that dictate the functionality of each processing element.

Figure 10:
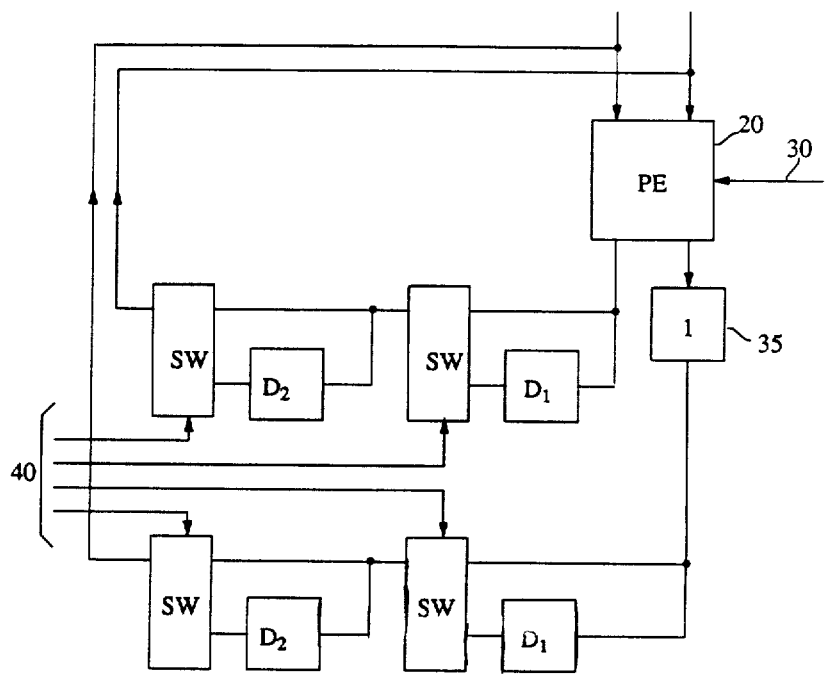
FIG. 10 presents an illustrative arrangement where the delay values are controllable.

Another source of flexibility in my architecture resides in the relationship between the delay elements. That relationship controls have effective connectivity of the array. In connection with FIG. 5, for example, the N, N+1 relationship creates the "adjacent neighbor" connectivity. A "skip one" connectivity would result, for example, when the delay value relationship is N, N+2. FIG. 10 presents an illustrative arrangement where the delay values are adjustable under influence of separate control signals. Delay elements $D_1$ and $D_2$ and attendant switches that follow are merely representative of any number of delay/switch combinations that can be connected in series between the outputs and the inputs of the processing element. Each switch selects either the direct signal path or the delayed signal path and thereby selected delay segments are inserted under control of signals or bus 40. The delays ($D_1$ and $D_2$) can be the same or different, and the controls to the upper string of delays and lower string of delays can be the same or different. This flexibility permits the realization of different array widths and different interconnection patterns.

Figure 11:
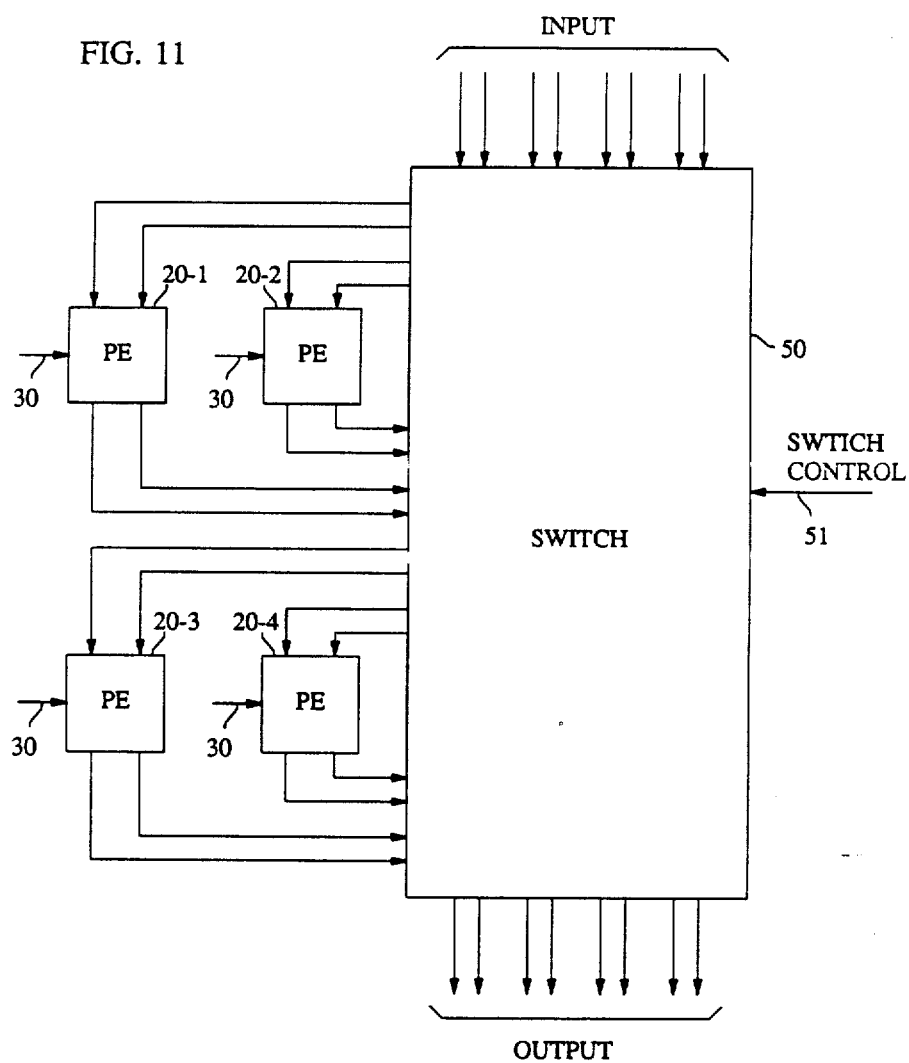
FIG. 11 shows the interconnection flexibility within a processing array.

Still additional flexibility exists when the array to be emulated is folded into a sub-array. In FIG. 9, for example, the interconnection of the individual processing elements in the 2×2 sub-array is fixed. However, there is no reason to maintain a fixed relationship between the elemental processing units in the sub-array; and once that is realized, one can see that an additional flexibility exists to trade processing time for parallelism. That is, the processing elements can be interconnected to form a column, to form a row, or any combination in between. When arranged to form a row, maximum parallel processing in realized. On the other hand, when arranged to form a column, maximum processing speed is realized (from the stand point of latency) for at least a part of the answer. In a sense, it permits pipelining of different tasks through the emulated array. This interconnection flexibility (not accounting for the choice of delay values) is illustrated in FIG. 11 where four processing elements interact with input and output terminals of the arrangement through switch 50. Switch 50, controlled via bus 51, can be any switch (e.g., crossbar) that effects the desired rearrangement flexibility.

I discovered that with architecture of my invention a truly general purpose processor can be realized with my architecture. Such has not been the case with prior art parallel processor arrays because these arrangements have always been adapted for a particular task, rather than for general processing. the control for such a general processor, like the control of my array for emulating any other function, is through the control port of the basic processing element array; e.g., bus 30 in FIG. 5. That control follows directly from the assignment of the processing load to the various processing elements in the emulated array. An example of the "assignment" process, which in effect is a design methodology, is presented below.

Of particular interest with respect to control of my architecture's realization of a general purpose computer is conditional branching. In conventional general purpose processors the stored program control often includes many branching statements. When branching is called for, the program counter jumps forward or backwards some number of instructions and that causes some instructions to not be executed, or to be executed in a different order. On first blush it may appear that in a processor where there is no program counter whose state may be preset (effectuating a "jump") conditional branching presents a difficult problem. In fact, it is no problem at all. Conventional computer architectures include a program counter, and counters whose state may be preset are easily realized. Causing a jump in the program counter requires more steps to be taken than merely incrementing the counter, but the additional processing time is usually more than recovered by the act of jumping over instructions that need not be carried out. On the other ahnd, conditional jumps may be avoided completely by incorporating the enabling condition(s) in the instructions, and by carrying out each of the instructions in order, but subject to the enablement. Normally one does not do this because each of the instructions is enabled or disabled individually and at least attempted to be carried out, and because each of the instructions is more complex since it incorporates a condition. With my architecture, however, the massive parallelism permits rather complex instructions to be carried out with no less speed than simple instructions, and therefore, it is advantageous to generally incorporate the conditional execution inherent in the conditional branching technique into the instructions themselves.

Stated in other words, both in conventional computers and in my computational origami the problem to be solved is mapped is some sense, and a hardware window (the CPU—in a conventional computer, and the processing element sub arrays—in my computational origami) is passed over the mapped problem. The main differnce is that my processing sub arrays scan whereas the CPU jumps over the problem in a directed manner via branching statements. The scanned approach suffers inefficiencies from having to visit inactive areas. The jumping approach suffers inefficiencies due to branching-induced instruction pipeline and cashe faults along with overhead associated with the allocation or registers. The scanned approach has the advantage of allowing an arbitrarily large window (i.e., larger and larger sub arrays) as well as allowing several hardware windows to simultaneously scan over the problem in a cooperative manner (cascading of subarrays).

There are, of course, situations where sections of a program are rarely accessed (e.g., upon detection of an error), and in a conventional architecture that rarely accessed code merely sits in the program store. No computing resources are expended. In accordance with the technique outlined above, conditions are incorporated in the sequentially-executed code and one would think that computing resources are expended unnecessarily, causing perhaps a reduction in processing speed. In general that will not happen but, in addition, there is no reason why the program store employed with my architecture cannot be divided in sections that are switched in or out, based on conditions being met. In other words, by switching program stores in and out provides complete flexibility.

While on the subject of program store, it should be apparent that any means for providing control signals to the processing elements in a sequential manner is acceptable. This can be a conventional random access memory or a delay line. Advantageously, the operating speed of whatever serves as the program store should be no lower than the operating speed of the processing elements (20). In the FIG. 4 embodiment of a processing element there is a need for six control signals, and those control signals can be obtained directly from, for example, six delay lines or obtained in coded form from three delay lines. Most likely the speed saving resulting from the direct control will outweigh the cost of the additional delay lines. The specific technology employed will, of course, control.

When addressing speed, one must also address the matter of synchronization. Although the processing elements described above are asynchronous, there is an implied synchronization in the use of delay lines to store output signals and in the clock-synchronized appearance of controls that are applied to the PEs from the program store. When the delays employed in the PE realizations (e.g., FIG. 5) are shift registers, then a clock must be supplied. When those delays are analog (e.g. quartz delay lines, or fiber optic cable) then the length must be carefully measured to correspond to the rate at which instructions are applied by the program store. When the program store is also an analog delay line, then the length of that delay must be closely related to the length of the delay lines in the PEs, and the distribution of signals in the program store delay line must correspond to the desired operating speed.

FUNCTIONAL DESIGN EXAMPLE

Implementation of an arbitrary processing function with my architecture can proceed by following a simple procedure that begins at any of the conventional starting points. This may be schematic diagrams, Boolean equations, state digrams etc. The examples below are simple illustrations of the methodology that may be implemented with any of the above approaches.

Figure 12:
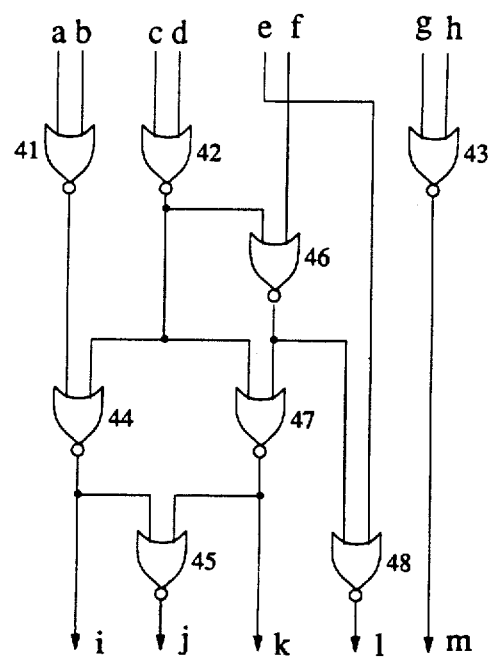
FIG. 12 is a schematic diagram of an example that is presented to illustrate the manner of implementing an arbitrary function.

FIG. 12 presents a schematic diagram that is to be implemented. For the sake of convenience the diagram is drawn in a manner that makes implementation easy; to wit, each gate relies on information that has been previously evaluated by circuitry above it. When a circuit is presented not in this manner, it can always be redrawn so that the above condition holds. Situations where the above cannot be accomplished correspond to situations of instability (oscillations) or the existence of memory elements that can be identified as such and effectively extracted from the logic realization. When it is determined that isolating the "memory" is convenient, the feedback path can be broken and the separated leads extended to the "top" and "bottom" respectively.

In FIG. 12, NOR gate 41 is responsive to input signals "a" and "b", NOR gate 42 is responsive to input signals "c" and "d", and NOR gate 43 is responsive to input signals "g" and "h". The output of gate 41 is applied to NOR gate 44 which feeds NOR gate 45 and output lead "i". The output of gate 42 is applied to NOR gates 44, 46 and 47, and the output of gates 44 and 47 are applied to gate 45. The output of gate 46 is also applied to NOR gate 48, which receives an additional input from input signal "e". Gate 46 also receives the additional input signal "f". The outputs of gates 45, 47, 48, and 43 form output signals "j", "k", "l", and "m", respectively. Output "k" and input "f" may be one such pair of signals that were initially connected to form a set reset flip flop arrangement.

Figure 13:
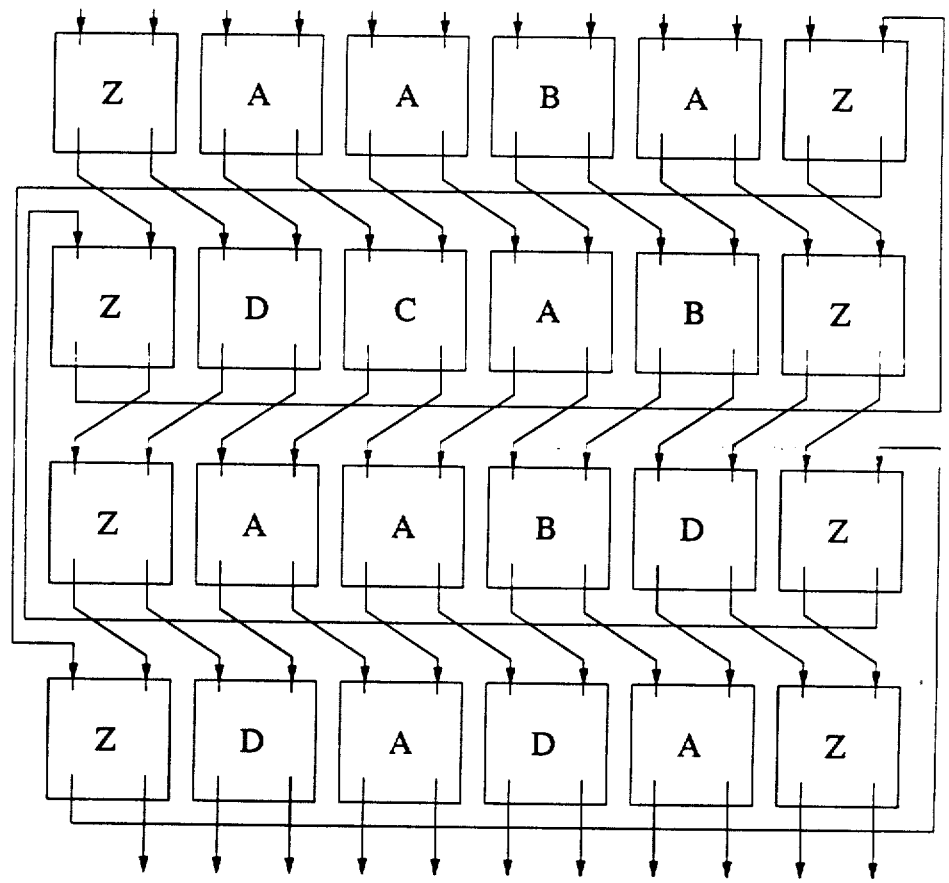
FIGS. 13 and 14 show a mapping of the FIG. 12 example onto an array.
Figure 14:
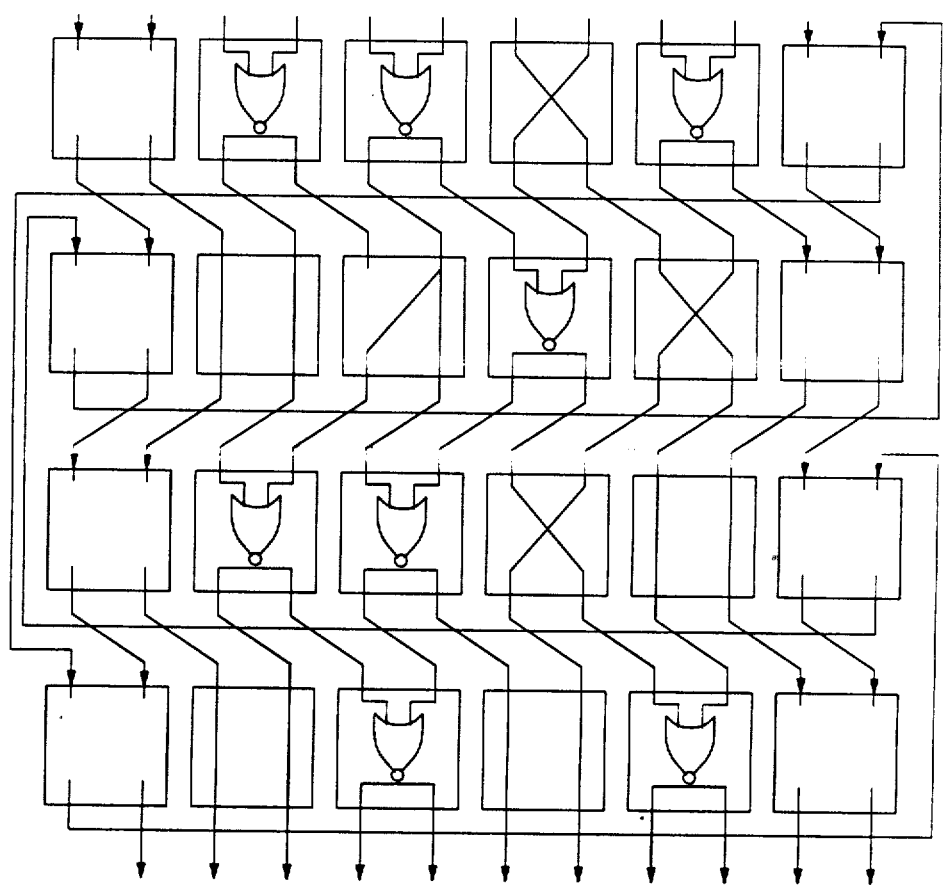
Figure 15:
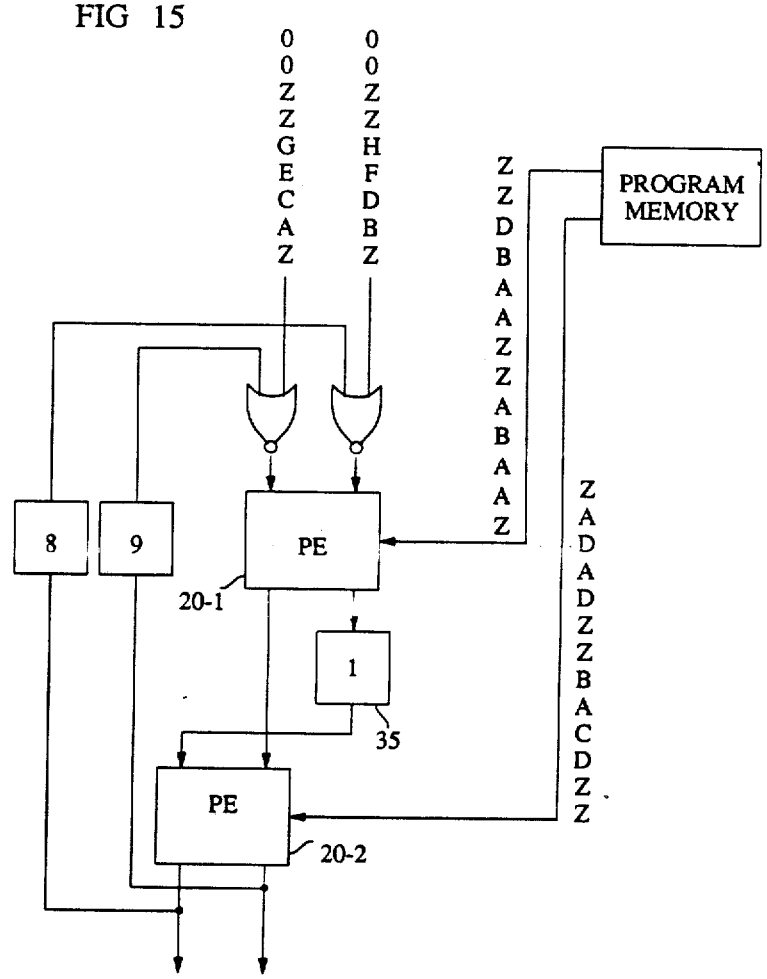
FIG. 15 depicts the realization of the FIG. 14 array with a multiplexed processing array of the type depicted in FIG. 7.

All of the active elements in FIG. 12 are NOR gates but it is well known that any Boolean function can be realized with NOR gates only. In the arrangement of FIG. 12, it can be seen that gates 41, 42 and 43 form the first row of processing elements. Gate 46 resides in the second row of processing elements, gates 44 and 47 are in the third row of processing elements and gates 45 and 48 are implemented in the fourth row of processing elements. Also as arranged in FIG. 12, there is no need for any additional rows to implement the necessary signal switching, or directing. This situation is illustrated in the realization of the FIG. 12 schematic diagram with the array depicted in FIG. 13. FIG. 13 has the same interconnection structure that is illustrated in FIG. 9 and the different processing elements in the array take on the different functions depicted in FIG. 13. The FIG. 12 circuit is implemented with a PE that realizes only four elemental functions: a NOR gate that provides its output signals to both outputs of the processing element, a cross-over connection, a left fork connection, and a pass-through connection. FIG. 14 highlights these functional assignments, with the letter A corresponding to the NOR gate, B corresponding to the cross-over, C corresponding to the left fork, D corresponding to the pass-through, and Z corresponding to a "don't care" condition. FIG. 15 illustrates the input signal and control signal flow into an embodiment of the FIG. 14 array with a two processing element arrangement.

Figure 16:
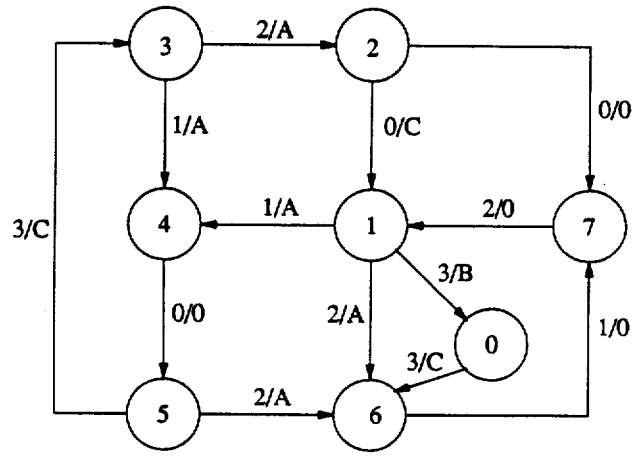
FIG. 16 is a state diagram of another example that is presented to illustrate the manner of employing the principles of this invention.

To illustrate the design methodologe when a state diagram is provided, FIG. 16 presents a simple state diagram for a finite state machine having eight different states (0–7). The paths connecting one state to another include an arrow to indicate direction of state flow and a designation in the form of "3/C". The designation to the left of the slash relates to the input which causes the transition of one state to the next along the path, and the designation to the right of the slash specifies the output occurring in connection with such a transition.

Figure 17:
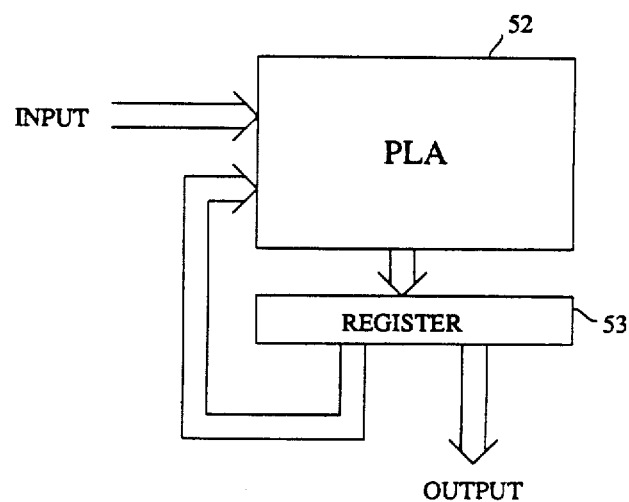
FIG. 17 presents a programmable logic array realization of the FIG. 16 state diagram, which assists in mapping the state diagram onto a regular array that is realizable in accordance with the principles of this invention.

It is well known that a finite state machine can be implemented with a programmable logic array and a register, as shown in FIG. 17. Register 53 contains the present state, and that state is employed as an input to PLA 52. PLA 52 is also responsive to the input of the finite state machine. PLA 52 has an output that contains two fields: the first is the next state of the finite state machine (which is loaded into register 53) and the second is the output message. A Boolean equation can be written for each bit of the PLA output. This is the Boolean equation that PLA 52 is required to realize. Given the collection of Boolean equations, a design can be implemented in accordance with the principles of my invention, as described above.

With respect to the FIG. 16 state diagram, for example, the table below completely describes PLA 52, and accordingly, each output can be described explicitly. For example, from a perusal of the table it can be seen that the output corresponding to the least significant bit of the state entered into register 53, signal $C_o$ is $$C_o = \bar{A}_i B_i \bar{C}_i \bar{D}_i \bar{E}_i + A_i \bar{B}_i \bar{C}_i \bar{D}_i \bar{E}_i + A_i \bar{B}_i C_i D_i E_i + A_i B_i \bar{C}_i \bar{D}_i E_i + A_i B_i C_i D_i \bar{E}_i$$

where $A_i$, $B_i$, $C_i$, $D_i$, and $E_i$ are the input signals of PLA 52 that correspond to the state and the inputs applied to the PLA.

| PLA input | | PLA output | |
|---|---|---|---|
| state | input | state | message |
| 000 | 11 | 110 | 11 |
| 001 | 00 | 010 | 11 |
| 001 | 01 | 100 | 01 |
| 001 | 10 | 110 | 01 |
| 010 | 00 | 111 | 00 |
| 011 | 01 | 100 | 01 |
| 011 | 10 | 010 | 01 |

-continued

| PLA input | | PLA output | |
|---|---|---|---|
| state | input | state | message |
| 100 | 00 | 101 | 00 |
| 101 | 10 | 110 | 01 |
| 101 | 11 | 011 | 11 |
| 110 | 01 | 111 | 00 |
| 111 | 10 | 001 | 00 |

The Boolean equation defined above can be expressed in terms of NOR function implementations in accordance with conventional techniques, and once so expressed, the Boolean function can be implemented in the manner described in connection with FIG. 12.

To illustrate how a general purpose computer is realized with my architecture it may be also useful to consider a simple programming example, such as a program that adds two numbers. In a conventional general purpose computer there is an A register, a B register, an arithmetic logic unit (ALU), a memory, and a program residing in the memory. A program to add two numbers would cause register A to be set to the first number, a subsequent instruction would cause register B to be set to the second number, and a still subsequent instruction would cause the ALU to perform the summation function.

Figure 18:
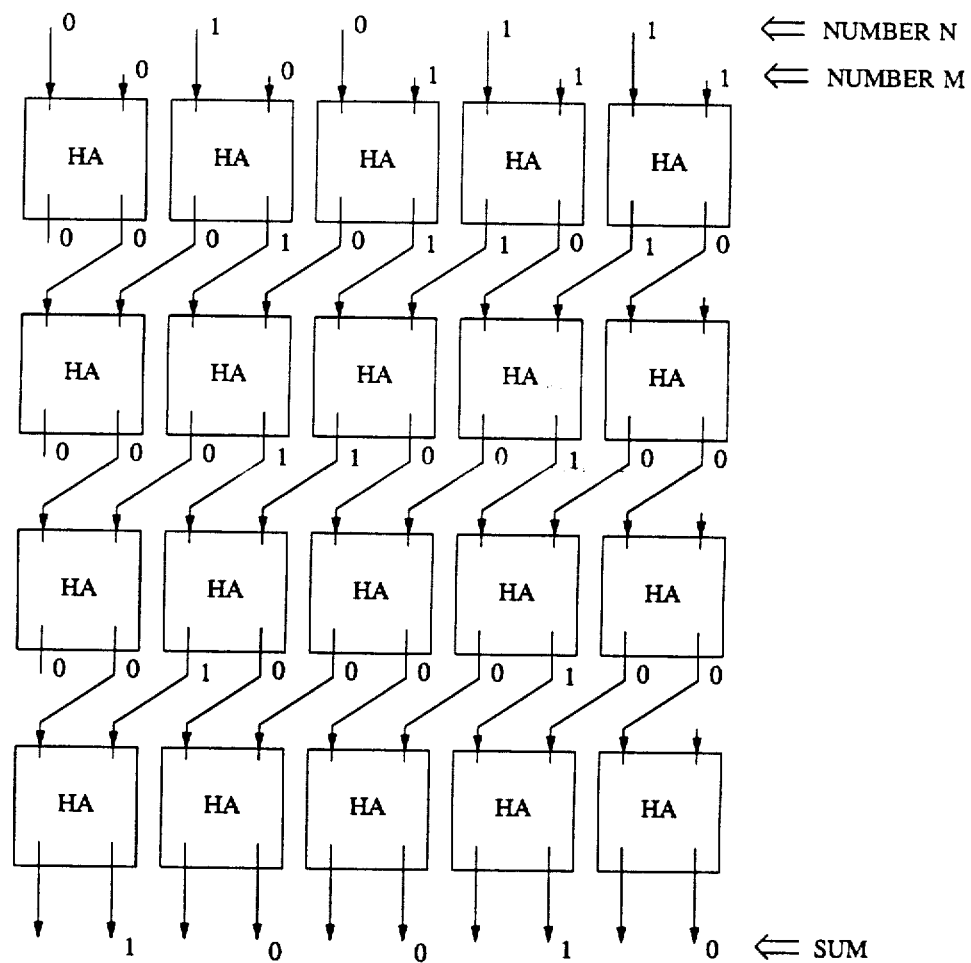
FIG. 18 illustrates the arrangement for adding two numbers in a computational origami where the processing elements are half adders.
Figure 19:
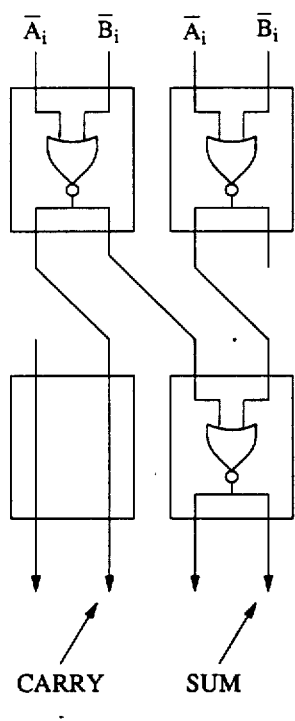
FIG. 19 depicts one means for realizing a half adder with an elemental processing elements of the type depicted in FIG. 5.

With my architecture, the two numbers to be added are generated in the first row of PEs, most likely in an interleaved manner, and subsequent rows cause the sum to be generated. To achieve high throughout, a pipeline approach would naturally be employed, perhaps with processing elements that include a half adder in the signal processing network. Such an arrangement is, in fact, shown in FIG. 18, where the numbers 01011 and 00111 are added with a network where the signal processing networks of the PEs are half adders (HA). When a PE as depicted in FIG. 4 is employed (where a NOR gate is used in the signal processing network), each half adder function, where a bit $A_i$ is added to a bit $B_i$, is realized with two rows, as shown in FIG. 19.

The above drawings and description are illustrative of the principles of my invention. It should be realized, of course, that various extensions and modifications can be envisioned by persons skilled in the art without departing from the spirit and scope of my invention. For example, although the processing element described in connection with FIG. 4 implements all the necessary functions, it is clear that more hardware can be incorporated in such a processing element. Also, although the processing element selected for most of the above description is a two input—two output device, there is no restriction that such must be the case at all times. A three input—three output device can, for example, be employed where the third lead connects processing elements in the same row or, alternatively, the third lead can be used to connect to a processing element in a different row. Indeed, the 1×2, 2×1, and 2×2 arrays depicted in the previous FIGS. can conceptually be viewed as multiple input and output processing elements.

As already indicated above, the signal processing network in the PEs can also include an arithmetic unit, a complete CPU of a conventional computer, or even an entire computer, for efficient folding and recasting of various computational algorithms. Various signal transform algorithms, such as FFT, come immediately to mind.

The processing element can also be a process within an operating system with the necessary messaging primitives. As such it could be used to organize the cooperation of the various processes and optimize the communications, between processes and, for example, disk memory.

Figure 20:
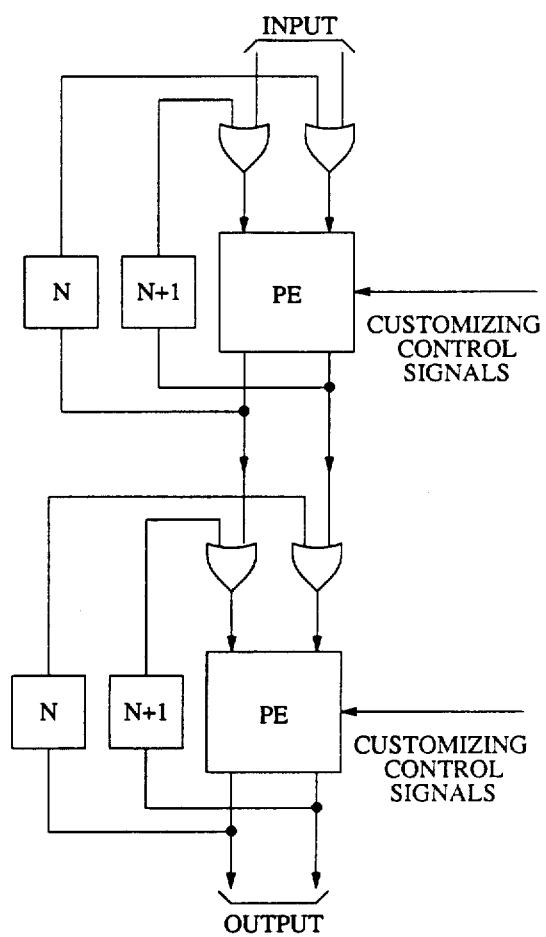
FIG. 20 illustrates a cascaded arrangement.

Viewed from a different perspective, a number of computational origami as described above can be cascaded by connecting the output of one computational origami to a subsequent computational origami. Cascading in effect divides the problem among the origami to permit a higher throughput. In effect, it is pipilining. FIG. 20 depicts one organization for a cascade arrangement, that is modeled after FIG. 5.

In general, my technique of taking an algorithm, casting the algorithm into regular format, mapping this format into either a slanted (e.g., FIG. 7) or alternately slanted (e.g., FIG. 8) array with unidirectional signal flow in each row, and folding it onto itself can be applied to any algorithm from the gate level to the systems level; both in hardware and software.

What is claimed is:

1. Computational apparatus including a processing element having a first and a second input port, a first and a second output port, and a control, characterized by
    said processing element performing both routing and computation functions;
    first delay means, connected to said first output port and to a first apparatus output port of said computational apparatus, for storing a preselected number of output signals of said first output port;
    first combining means responsive to output signals of said first delay means and to signals applied to said computational apparatus at a first apparatus input port for applying a combination of its input signals to said second input port;
    second delay means, connected to said second output port and to a second output port of said computational apparatus, for storing another preselected number of output signals of said second output port;
    second combining means responsive to output signals of said second delay means and to signals applied to said computational apparatus at a second apparatus input port for applying a combination of its input signals to said first input port; and
    means for applying control signals to said control port and causing said processing element to execute preselected processing and signal routing functions.

2. The apparatus of claim 1 wherein said processing element includes
    a signal processing network connected to said first and second input ports, for performing said computation function; and
    a signal routing network responsive to input signals at first and second input ports and to output signals of said signal processing network, for performing said routing function.

3. The apparatus of claim 2 wherein said signal routing network includes the means to switch any of the input signals to one or both of said output ports.

4. Signal processing apparatus characterized by a plurality of processing elements arranged in an array of rows and columns, with each processing element in a row and a column having one input port connected to one output port of a processing element in a previous row and the same column, and another input port connected to another output port of a processing element in said previous row and another column, where input ports of processing elements in the first row of said array accept input signals to said computational apparatus and output ports of processing elements in the last row of said array comprise output signals of said computational apparatus, said computational apparatus being further characterized by:
    a plurality of delay means, each connected to an output port of a different one of said processing elements in said last row and each storing its a number of clock-synchronized output signals of said processing element;
    means for applying output signals of said plurality of delay means to said input ports of said processing elements; and
    means for controlling, in a clock-synchronized manner, the operational functionality of each of said processing elements.

5. The apparatus of claim 4 wherein said means for controlling directs each of said processing elements in said array to perform a selected processing function, independently of the processing function selected for performing by other processing elements.

6. The apparatus of claim 4 where said delay means provides a signal delay value realizes a selected interconnection pattern in a larger emulated array of interconnected processing elements.

7. The apparatus of claim 6 wherein said delay means has a delay value that is controlled by an applied control signal.

8. The apparatus of claim 7 wherein said delay means control signal is dynamically alterable to control the width of said emulated array.

9. Processing apparatus comprising a plurality of processing elements arranged in rows and columns characterized in that:
    some of said processing elements are main-stream processing elements, at least one of said processing elements is a feedback-supplying processing element, and at least one of said processing elements is a fedback receiving processing element;
    each main-stream processing element in a given row and a given column sends output signals to a processing element in a row succeeding said given row and in said given column, and to a processing element in said succeeding row and in a column succeeding said given column;
    each feedback-supplying processing element sends output signals to one of said feedback-receiving processing elements in a row preceding the row of said feedback-supplying processing element;
    each of said processing elements in a given row and a given column is, at most, connected to one of said processing elements in subsequent row and said column and to one of said processing elements in an adjacent column; and
    each of said processing elements performs a selected processing operation independent of the processing operations selected for being performed by other processing elements in said processing apparatus.

10. The processing apparatus of claim 9 wherein each of said main-stream processing element in a row i and column j has one output lead connecting said processing element to a processing element in row i+1 and row j, and one output lead connecting said processing element to a processing element in row i+1 and column j+(−1)$^i$K where K is an integer constant for each row.

11. The processing apparatus of claim 9 wherein each of said main-stream processing element in row i and column j has one output lead connecting said processing element to a processing element in row i+1 and row j, and one output lead connecting said processing element to a processing element in row i+1 and column j−(−1)$^i$K where K is a constant for each row.

12. The processing apparatus of claim 9 wherein each of said main-stream processing element in row i and column j has one output lead connecting said processing element to a processing element in row i+1 and one output lead connecting said processing element to a processing element in row i+1 and column j+K where K is a constant for each row.

13. The processing apparatus of claim 9 wherein each of said main-stream processing element in row i and column j has one output lead connecting said processing element to a processing element in row i+1 and row j, and one output lead connecting said processing element to a processing element in row i+1 and column j−K where K is a constant for each row.

14. The apparatus of claim 1 wherein said preselected number and said another preselected number are related to each other.

15. The apparatus of claim 1 wherein said first delay means stores N output signals and said second delay means stores N+1 output signals, where N is a preselected constant.

16. The apparatus of claim 2 wherein said processing network comprises means to perform a set of computations that constitute a complete boolean cover.

17. The apparatus of claim 2 wherein said processing network comprises a CPU.

18. The apparatus of claim 2 wherein said processing network comprises a computer.

19. The apparatus of claim 4 wherein said signal processing element comprises a NAND gate or a NOR gate.

* * * * *